(12) United States Patent
May, Jr. et al.

(10) Patent No.: US 6,321,255 B1
(45) Date of Patent: *Nov. 20, 2001

(54) EXTENSIBLE STORAGE OF NETWORK DEVICE IDENTIFICATION INFORMATION

(75) Inventors: William B. May, Jr., Sunnyvale; Derek J. Brown, Newark; Robert M. Haragan, Jr., Los Altos; Guenter E. Roeck, San Jose, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,877

(22) Filed: Apr. 10, 1998

(51) Int. Cl.[7] .................................................. G06F 15/167
(52) U.S. Cl. .......................... 709/216; 709/212; 709/245; 709/223; 710/9
(58) Field of Search .................................. 709/212–216, 709/245, 250, 223; 710/3–4, 8–9

(56) References Cited

U.S. PATENT DOCUMENTS

| | | | |
|---|---|---|---|
| 5,250,940 | 10/1993 | Valentaten et al. | 345/189 |
| 5,287,103 | 2/1994 | Kasprzyk et al. | 340/825.52 |
| 5,509,006 | 4/1996 | Wilford et al. | 370/60 |
| 5,513,351 | 4/1996 | Grantz | 395/600 |
| 5,553,135 | 9/1996 | Xing | 379/399 |
| 5,621,721 | 4/1997 | Vatuone | 370/16 |
| 5,668,803 | * 9/1997 | Tymes et al. | 370/312 |
| 5,673,265 | 9/1997 | Gupta et al. | 370/432 |
| 5,768,618 | * 6/1998 | Erickson et al. | 710/9 |
| 5,835,601 | 11/1998 | Shimbo et al. | 380/49 |
| 5,918,241 | * 6/1999 | Egy | 710/8 |
| 5,959,990 | * 9/1999 | Frantz et al. | 370/392 |
| 5,968,116 | * 10/1999 | Day, II et al. | 709/220 |
| 5,974,532 | * 10/1999 | McLain et al. | 712/208 |
| 6,021,429 | * 2/2000 | Danknick | 709/245 |
| 6,047,376 | 4/2000 | Hosoe | 713/201 |

\* cited by examiner

*Primary Examiner*—Ayaz Sheikh
*Assistant Examiner*—Philip B. Tran
(74) *Attorney, Agent, or Firm*—Thelen Reid & Priest LLP; Marc. S. Hanish

(57) ABSTRACT

A method for dynamically storing network device identification information to allow for the easy addition of new fields as well as simple modification of identification fields. This method involves receiving the device identification information, determining the type and length of the device identification information, choosing one or more symbols to represent the type and length of the identification information, and storing the symbols as well as the identification information in a memory store associated with the device. Choosing the symbols may be accomplished by either choosing a single symbol to represent both the type and length of the identification information, or by utilizing a first symbol which represents the type of the information and a second symbol which represents the length. An extension address symbol may be used if it is not possible to find a symbol to represent the type and length of the identification information.

42 Claims, 4 Drawing Sheets

EXTENSIBLE STORAGE OF NETWORK DEVICE IDENTIFICATION INFORMATION

BACKGROUND OF THE INVENTION

1. Field of the Invention

The present invention relates to the field of computer networking. More particularly, the present invention relates to a method and an interface for storing identification information on network devices.

2. The Background Art

A computer network contains a number of hardware devices connected to each other via the network. Each hardware device normally contains information on the identification of that device. This information is usually stored on a programmable read only memory chip (PROM) but any number of non-volatile memory storage media are possible. When the memory device is a PROM, it is usually referred to as the ID PROM of the device, even though it is not necessary that the storage medium be a PROM. The type of information stored on each of these devices usually includes identification information such as the device's serial number or its part number.

Device identification information is used by network devices in a number of different fashions. The device actually storing the information may require the information during its use. For example, a device such as a router may use identification information contained within its memory store in order to determine how to control the network. Also, a management station or other device elsewhere on the network may use identification information from the memory store of a device to aid in the management of the system or for a number of other reasons.

FIG. 1 depicts an example of a network in which the management station requests identification information on a device. The management station 10 requests a piece of identification information (e.g. a serial number) from device A 12. This request will travel across the network to the device A 12. An interface 14 built into the device A 12 will then handle the instruction, retrieving the appropriate information from the memory store of the device, and sending the information to the management station 10. The interface need not be contained on the device itself, as it is possible for the management station 10 control all of the information retrieval for each node on the network. However, due to the complexity of most systems, it is often more efficient to have the interface located on each device and designed in such a way that it is streamlined for use with that device.

Storage of the identification information in the memory store of the device is usually performed by the interface as well. FIG. 2 depicts the device A 12 of FIG. 1 in greater detail. The interface 14 receives the information, then stores it in the address or addresses in the memory store 16 that it has assigned to identification information of that type. An example of how an interface may organize identification information is given in table 1. In this example, all of the types of identification information the interface may store are assigned unique register and block addresses in the memory store. "EEPROM version" has been assigned to address 00, while "controller type" has been assigned to address 01, and so on. This is known as a fixed address format, as each type of information is assigned a fixed and unique address or addresses.

There are several disadvantages, however, to using such a fixed address format. As new versions of software and hardware devices are created, there are often additional types of identification information that the manufacturer wishes to place on the memory store of the hardware device. These new fields may not always be foreseen at the time the interface was created. While it is possible to use one of the unused addresses (in the example in Table 1 below there are several unused addresses, including 1A to 1E and 26 to 80), this is a dangerous solution as it is possible that other components of the network may be using those addresses for storage of other types of information. Additionally, this solution requires that the interface be updated to recognize the new information type and to possess the knowledge as to what address the new information type is to be stored.

TABLE 1

| Block Address | Description |
| --- | --- |
| 00 | EEPROM Version |
| 01 | Controller Type |
| 02 | Hardware Version High Byte |
| 03 | Hardware Version Low Byte |
| 04:07 | Serial Number |
| 08 | PCA Item Number - Class Code |
| 09:0A | PCA Item Number - Base Number |
| 0B | PCT Item Number - Version |
| 0C | Test History - RMA Failure Code |
| 0D | RMA number - Byte 2 |
| 0E | RMA number - Byte 1 |
| 0F | RMA number - Byte 0 |
| 10 | Board Revision |
| 11 | Deviation number - (see note 1) |
| 12 | Deviation number - (see note 1) |
| 13 | Board Configuration |
| 14 | Manufacturing Date Code - YY |
| 15 | Manufacturing Date Code - MM |
| 16 | Manufacturing Date Code - DD |
| 17 | Card Connector Type |
| 18:19 | ASIC Revision |
| 1A;1E | Undefined - Program to FF |
| 1F | Development Engineering |
| 20:25 | Field Diagnostics |
| 26:30 | Undefined - Program to FF |

Another drawback of the fixed address format is the fact that it creates the possibility of wasted space on the memory store. All recognized information types must be assigned a unique address or addresses. These addresses must be reserved for the identification information and cannot be used to store other types of information. While it is normally the case that all of the identification information address will be used, there are sometimes situations where some of the addresses may not be used, for example, if a device no longer needs to keep track of a certain information type due to changes in the network setup. It would be preferable to have a system that would not use up any more space than is needed, allowing for the extra space to be used for other functions.

Finally, the fixed address format requires an overly rigid organizational scheme for identification information. The interface must not only keep track of identification information types, but also keep track of the specific addresses where those identification information types are located. The result is an overly complex interface. It would be preferable to have a system that did not require such an overly rigid organizational scheme, and thus would allow for a much simpler interface design.

BRIEF DESCRIPTION OF THE INVENTION

A method for dynamically storing device identification information to allow for the easy addition of new fields as well as simple modification of identification fields. This method involves receiving the device identification information, determining the type and length of the device identification information, choosing one or more symbols to represent the type and length of the identification information, and storing the symbols as well as the identification information in a memory store associated with the device. Choosing the symbols may be accomplished by either choosing a single symbol to represent both the type and length of the identification information, or by utilizing a first symbol which represents the type of the information and a second symbol which represents the length. An extension address symbol may be used if it is not possible to find a symbol to represent the type and length of the identification information.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

According to the present invention, a method for storing identification information in the memory store of a device on a network is provided. This method will utilize a modified type/length/value data structure in the storage and retrieval of device identification information to and from a memory store within the device. The process involves assigning a unique symbol to each type of information stored in the memory store. This unique symbol will represent the type of the data as well as either the length of the data, or the fact that an optional length field in the next address will contain the length of the data. The value field is then used to store the data.

Figure 3:
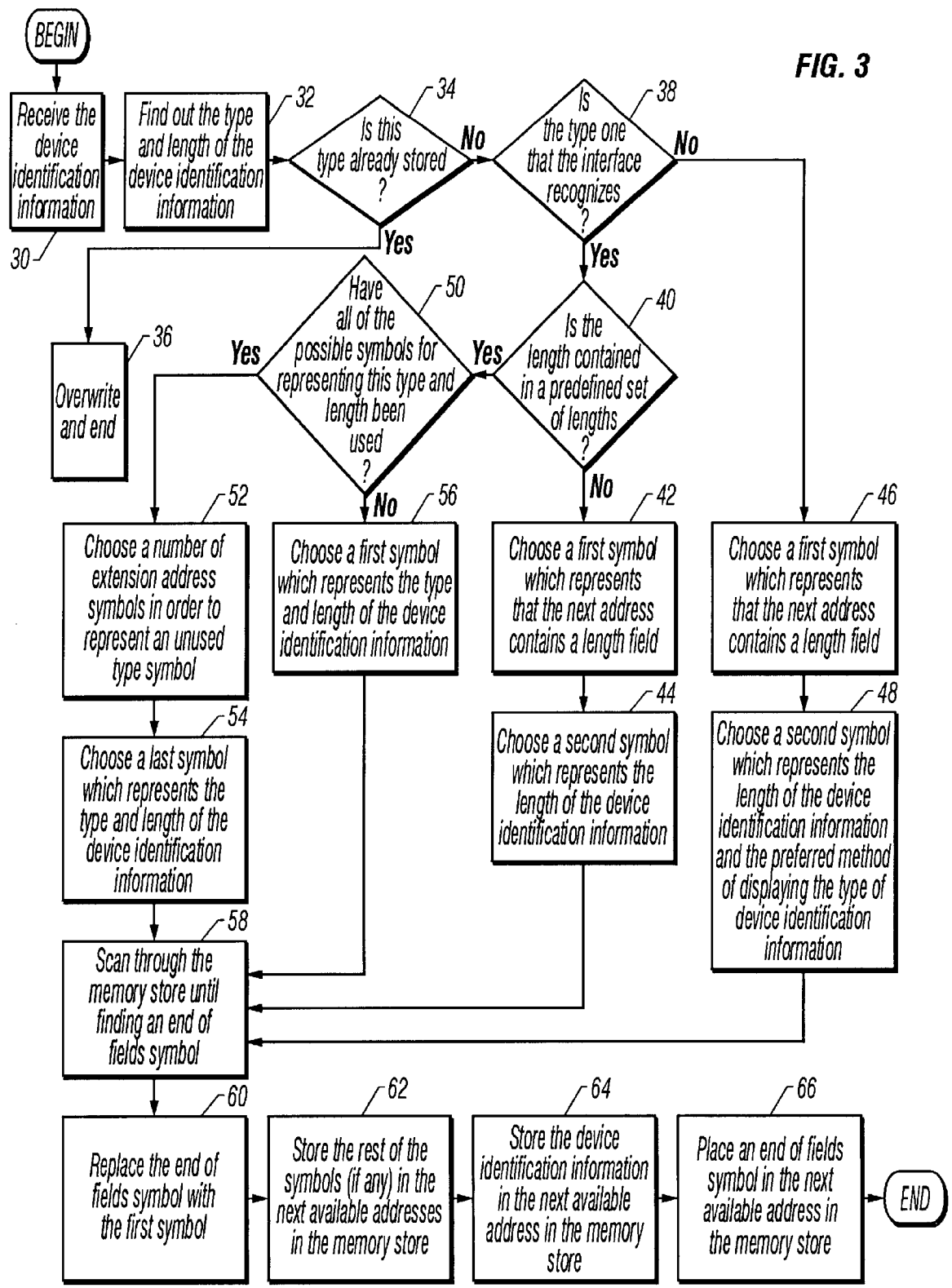
FIG. 3 is a flow diagram illustrating a method in accordance with a presently preferred embodiment of the invention.

FIG. 3 depicts a method in accordance with a presently preferred embodiment of the present invention. The method is performed by the interface of the device. However, this method could also be performed by other components of the network should the user so desire. Some of the device identification information will in most cases be stored by using the present invention during the manufacture of the device. Information such as serial number of the device is unlikely to change during the lifetime of the device and therefore could be stored at that time without the possibility of it changing. The advantage of using an EEPROM or a similar non-volatile memory device as the memory store is that the contents of the memory can easily be changed by a user, management station, or other components of the network while remaining intact through inevitable power failures and the like. This allows for such identification information types as Field Diagnostics Data to be stored as well, since it is possible to modify any of the fields during the lifetime of the device. Therefore, the storage of identification information may take place during manufacture of the device, or during its use.

Figure 1:
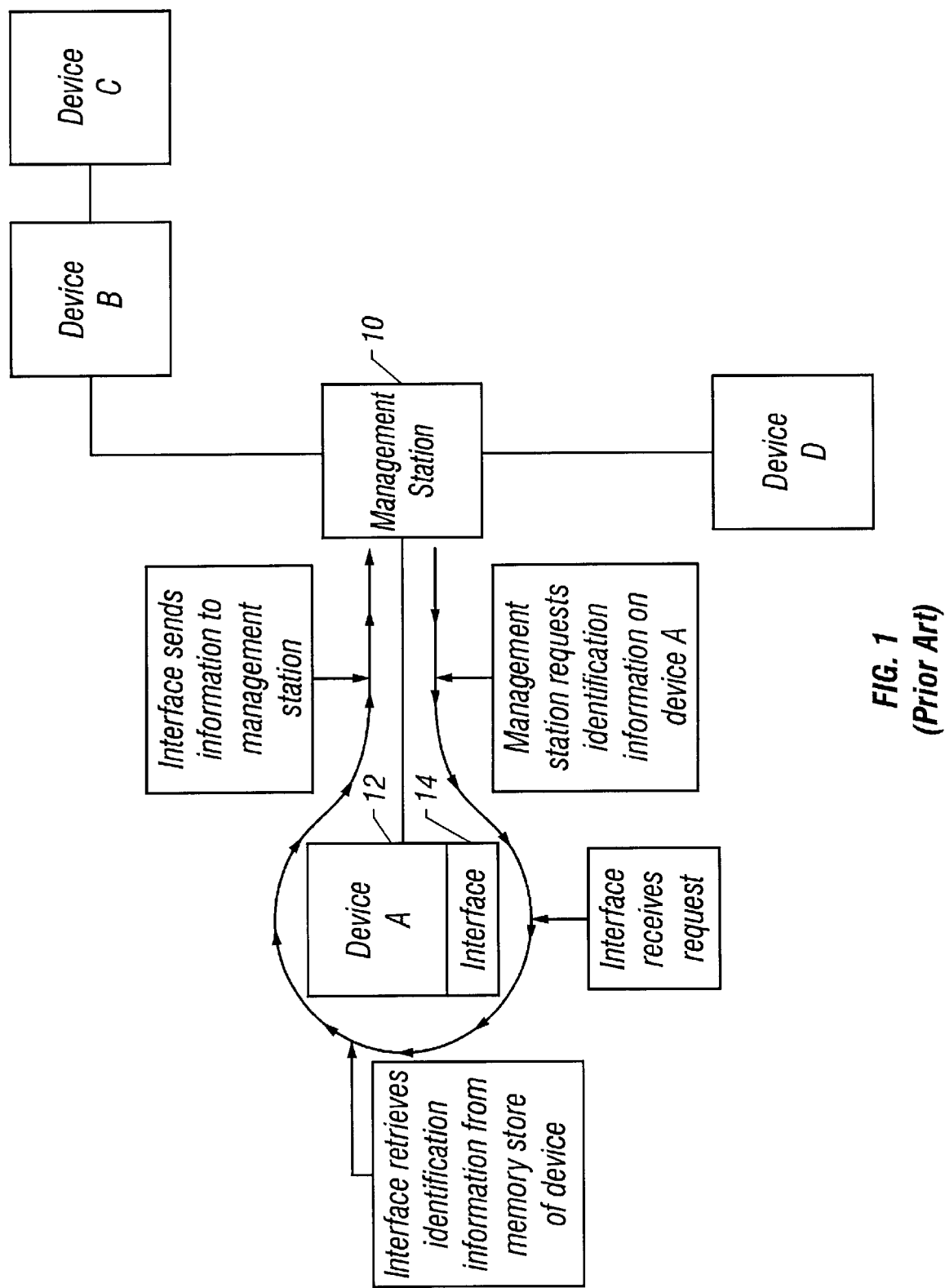
FIG. 1 is a block diagram showing an example of a network having a management station and attached devices in accordance with the background art.
Figure 2:
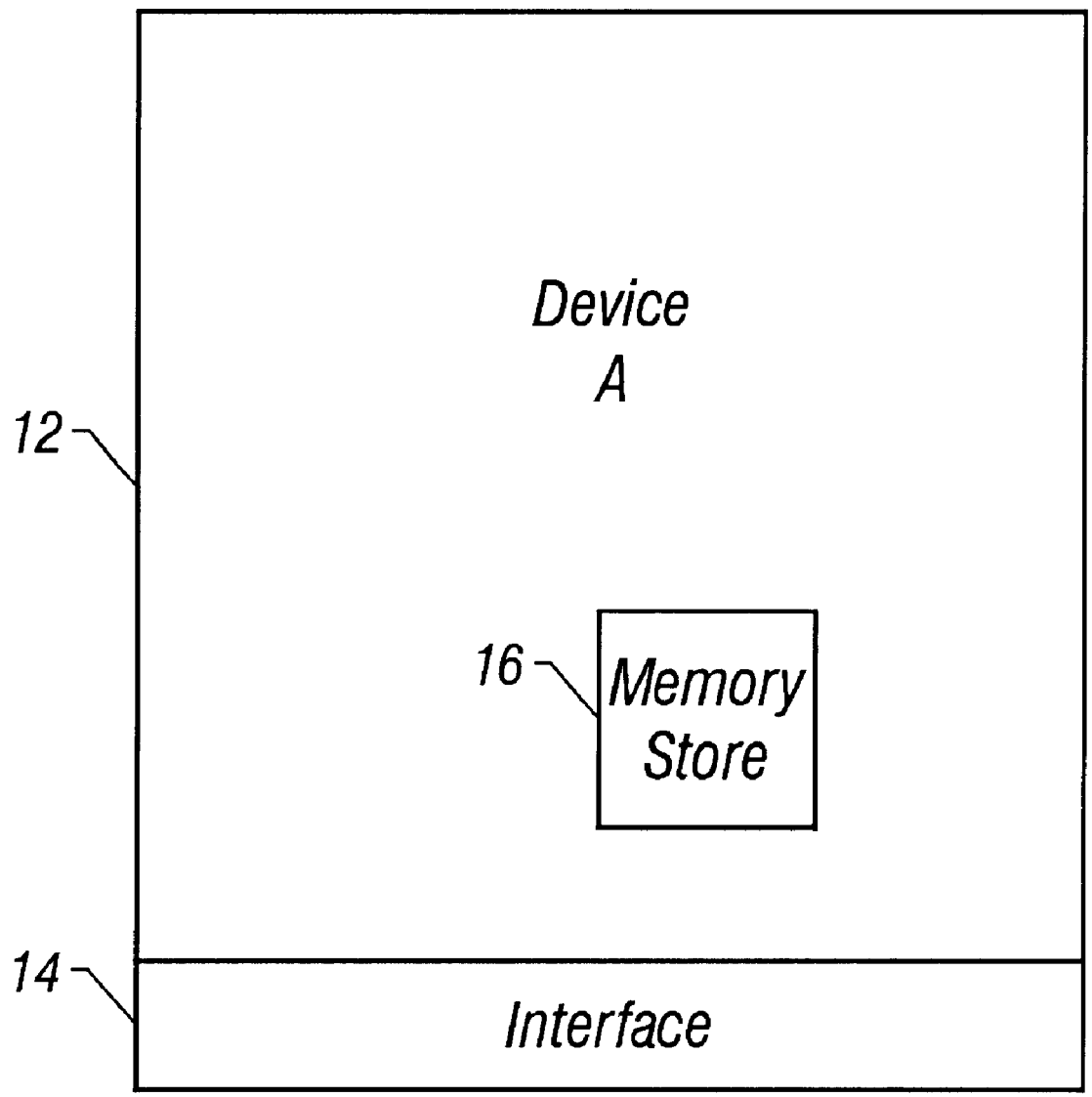
FIG. 2 is a diagram showing Device A of FIG. 1 in greater detail.

The process begins at step 30 when device identification information is received by interface 14 (FIGS. 1,2). For purposes of this specification, this device identification information is received one type at a time. Therefore, all of the information regarding serial number will be received, then the process will be initiated. After the process has finished, the interface can then receive another device identification information type. Those of ordinary skill in the art will recognize, however, that the data can be received in any number of ways, including all at once.

Once the device identification information is received, the process moves to step 32, where it finds out the type and length of the device identification information. Most likely, this would have been passed along with the identification information, so the interface need only receive the type and length of the device. However, implementations are possible where only the type of the data is sent, and the interface must look at the data and determine the length. Once the identification information, the identification information type, and the length of the identification information are known, however, the method may proceed to storing the information.

At step 34, the interface may scan through the memory store looking for a type field which matches the type of information to be stored. If this information type already exists in the memory store, the interface need only overwrite the data relating to that field in the same way it did when it originally stored the data. This is performed at step 36, at which point the process may end. Since the present invention is drawn to the original storage of the information, however, it is where the information received is of a type which has not been stored yet that the present invention really applies.

If this is the case, at step 38, the interface determines whether or not the identification information type is one that is recognized. In many cases, the interface is designed with a table of defined identification information types and the corresponding symbols used to represent them (which will be used later in the process). This table is normally contained in the latest software release for the device interface (it may also be contained in hardware). It is common for this table to be updated when a new version of the software is released if new identification information types are planned to be used. An example of such a table is shown in Table 2 below.

Each of the defined identification data types has been assigned a unique hexadecimal number. For example, the identification information type "Number of slots" has been assigned hexadecimal number 01, which corresponds to binary number 00000001. At step 38, the interface may scan through the table to see if any of the defined types match the current identification information type. If one of them does, then the identification information type has been defined.

TABLE 2

| Type Field | Description |
| --- | --- |
| 0x01 | Number of slots |
| 0x02 | PCB Flab Version |
| 0x03 | RMA Test History |
| 0x04 | RMA History Information |
| 0x05 | Card Connector Type |
| 0x06 | EHSA "preferred master" |
| 0x40 | Controller Type |
| 0x41 | Hardware Version |

TABLE 2-continued

| Type Field | Description |
| --- | --- |
| 0x42 | PCB Revision |
| 0x43 | MAC Address Block Size |
| 0x80 | Deviation Number |
| 0x81 | RMA Number |
| 0x82 | PCB Part Number, 73-level |
| 0xC0 | PCB Part Number, 800-level |
| 0xC1 | PCB Serial Number |
| 0xC2 | Chassis Serial Number |
| 0xC3 | MAC Address |
| 0xC4 | Mfg. Test Eng. Information |
| 0xC5 | Field Diagnostic Information |
| 0xC6 | CLEI Codes |
| 0xC7 | ENVMON Information |
| 0xC8 | UBR-MC Calibration |

It is possible that upon encountering an undefined identification information type, the user may want to assign it a new symbol and define it. The problem with defining it is that updating the list of defined fields is something usually reserved for upgrades to the device or to the interface (such as a new software version for the interface). It is unlikely that the user will want the process built into the interface to have the power to alter the table of defined fields due to the inherent compatibility issues that arise. However, the present invention extends to an embodiment where the table of defined fields can be altered by the interface.

When the defined fields table is not able to be altered by the interface, it is necessary for the interface to still somehow maintain a record of the new fields it adds to the memory store. This can be accomplished using an adjunct table to the defined fields table which keeps track of the field type and the symbol used to represent identification types which are stored on the device, but which have not been officially defined yet. This table can then be used along with the defined fields table when scanning through the memory store to determine if a specific field is recognized, as depicted at step 38 of FIG. 3. However, there are many ways for the interface to keep track of this information and the present invention is not limited to storage in a table.

The process then will choose a symbol to represent the type of the identification information as well as either the length of the data, or the fact that an optional length field will be used in the next address which will contain the length of the data. Since the ranges of these symbols must be predefined, the possible lengths that can be represented using the same symbol as the one representing type must also be predefined. Table 3 depicts one example of a predefined scheme for use with the present invention.

TABLE 3

| Type Field | Description | # used/available |
| --- | --- | --- |
| 0x01:0x3F | no length field, 1 byte data field | 6/57 |
| 0x40:0x7F | no length field, 2 bye data field | 4/60 |
| 0x80L0xBF | no length field, 3 byte data field | 3/61 |
| 0xC0:0xFE | next byte is length field | 9/54 |
| 0x00 | extends to next byte for type | n/a |
| 0xFF | last field, no more fields in ID PROM | n/a |

In Table 3, symbols in the range of hexadecimal numbers 01 through 3F are used to represent the types of identification information data which are one byte in length. Symbols in the range of hexadecimal numbers 40 through 7F are used to represent the types of identification information data which are two bytes in length. Symbols in the range of hexadecimal numbers 80 through BF are used to represent the types of identification information data which are four bytes in length. Therefore, any of the symbols in the range of hexadecimal numbers 01 through BF may be used to represent both the type of the identification information and its length. Symbols in the range of C0 through FE are used to represent the types of the identification information as well as the fact that the next address contains a length field with the length (in bytes) of the identification information.

Referring back to the defined identification information types of Table 2, it is clear that these symbols were chosen to match the ranges in Table 3. Therefore, the identification information types entitled "Number of Slots", "PCB Fab Version", "RMA Test History", "RMA History Information", "Card Connector Type", and "EHSA preferred master", are all types that will contain data that is preferably one byte in length. "Controller Type", "Hardware Version", "PCB Revision", and "MAC Address Block Size" are all types that will contain data that is preferably two bytes in length. "Derivation Number", "RMA Number", and "PCB Part Number, 73-level" are all types that will contain data that is preferably four bytes in length. All of the rest of the types have been assigned symbols which represent that their length will be contained in the address following the address having the symbol representing their type. There are a couple of different reasons why this last group of symbols may be used. First, they are obviously used for data types with lengths that are not in the predefined set of lengths (the predefined set of lengths in the present example being {1,2,4}). Thus, if a identification information type had data of length 8 bytes, it would probably be assigned a symbol in the range of C0 through FE). Second, as will be explained below, when storing a data type which is not recognized by the interface, it is sometimes preferable to signify to the interface how to display such data (i.e., whether to display in hexadecimal, decimal, or ascii format). It is possible to utilize the length field to store information regarding how the information is to be displayed, alleviating a concern about backward compatibility of new information types that are added in between software updates. Therefore, a symbol in the range of hexadecimal numbers C0 through FE may be used in the case where a identification information type is stored which is not contained in the defined fields table.

Since the first step in choosing an appropriate symbol is to determine whether the symbol should represent the type and length of the identification information, or the type of the information and the fact that the next address contains a length field, steps 38 and 40 aid in making the decision. If, at step 38, the type is determined to be one that is not recognized, then the symbol will represent the type of the information and the fact that the next address contains a length field because, no matter the length of the data, the optional length field will be used to store information on the preferred method of displaying the type of the device identification information (as will be described below). However, if step 38 determines that the type is recognized by the interface, step 40 will be used to determine what the symbol placed in the type field will represent.

At step 40 the process determines if the length of the device identification information is contained in a predefined set of lengths. In the example from Table 3, the predefined set of lengths was {1,2,4}. If the length of the identification information is within this set (e.g., the length of the identification information is 2 bytes), then the process will choose a symbol representing the type and length of the identification information (the precise method of this will be described below). However, if the length of the identification information is not within the this set (e.g. the length of the identification information is 8 bytes), then the process will move to step 42, where a first symbol is chosen which represents the type of the identification information and the fact that the next address contains a length field. If the organizational scheme of Table 3 is used, this would mean choosing a symbol in the range of hexadecimal numbers C0 through FE).

Then, at step 44, a second symbol is chosen which represents the length of the device identification information. This is the length field, and most likely would simply be stored as a hexadecimal number exactly matching the length. Therefore, a length of 3 bytes will be represented by the hexadecimal number 03, while a length of 10 will be represented by the hexadecimal number 0A. The process then moves onto placing the symbols and the device information in the memory store, which will be described below.

If the type of the device identification information is not one which is recognized by the interface, a length field will also be used. At step 46, a first symbol is chosen which represents the type of the identification information and the fact that the next address contains a length field. This step is identical to step 42 described above. At step 48, a second symbol is chosen which represents both the length of the device identification information and the preferred method of displaying the device identification information. As described above, this is useful in allowing for backward compatibility so that an interface or other network component that is unfamiliar with a new identification information type may still, at least, be able to display it in the proper format. The preferred method of accomplishing this is to reserve the upper two bits of every length field for use as an identifier representing the proper display format. Therefore, the binary 00 in those upper two bits represents hexadecimal format, the binary 01 in those upper two bits represents decimal format, and the binary 10 in those upper two bits represents ASCII format.

The result of reserving the upper two bits of a one byte length field is that the possible lengths are somewhat limited. If two out of the 8 bits are reserved, that leaves only 6 bits to represent the length. While it is possible to expand the length field to encompass more than one byte, in most applications this will be unnecessary as device identification information is normally quite small, and the odds of having device identification information longer than 63 ($2^6-1$) bytes is extremely rare. Therefore, while there is a theoretical bound on the maximum length of identification information when using a one byte length field with reserved bits for displaying the preferred method of display, this boundary is not much of a limitation in real-world applications.

After the second symbol is chosen at step 48, the process moves on to placing the symbols and the device information in the memory store, which will be described below.

If, at step 40, the length is determined to be contained in the predefined set of lengths, the process will move to choosing a symbol which represents the type and the length of the identification information. At step 46, the process determines if all of the possible symbols for representing this type and length have been used. Referring back to the organizational scheme of table 3, there are 63 possible symbols for representing identification information of a 1 byte length (hexadecimal numbers 01 through 3F), 64 possible symbols for representing identification information of a 2 byte length (hexadecimal numbers 40 through 7F), and 64 possible symbols for representing identification information of an 8 byte length (hexadecimal numbers 01 through 3F). As can be seen in the third column of table 3, in this organization scheme there are many possible symbols for each group which are unused (i.e. undefined). This scheme should provide for plenty of room for growth, as there are many possible undefined symbols for each byte size. However, should the symbols eventually run out for a particular group, the present invention includes a mechanism for providing for more symbols.

At step 50, the process determines what range of symbols are the possible symbols for data of the present length, and determines if there are any symbols left for representing the type and length. For example, suppose the current identification information is 1 byte in length, the process will look for any unused symbols in the range of hexadecimal number 02 through 3F. However, what if all of the symbols in this range have been assigned (either predefined or added later)? In this rare instance, the process may move to step 52, where a number of extension address symbols are chosen, and step 54, where a last symbol is chosen which represents the type and length of the device identification information. According to the organizational scheme of table 3, the symbol representing an extension address is the hexadecimal number 00. This symbol represents that the type field (most likely located in the next byte) should be read together with the extension byte to determine the type of the identification information, while the length of the identification information can be determined by the type field. In the example given above, since all of the symbols in the range of hexadecimal numbers 01 through 3F are used, an extension symbol is placed in address, followed by a type field containing the first symbol in that range. Therefore, the first symbol would be 00 and the second symbol would be 01. Each successive one byte type that needs to be assigned will then take up another symbol in the original range, but place it in the field after the extension byte (e.g. 1st symbol=00, 2nd symbol=02; 1st symbol=00, 2nd symbol=03, etc.) if this range of numbers eventually fills up, it is even possible to place a second extension address symbol in the memory store (e.g. 1st symbol=00, 2nd symbol=00, third symbol=01; 1st symbol=00, 2nd symbol=00, 3rd symbol=02, etc.) Thus, there is no longer a theoretical bound on the number of possible symbols for each identification information length.

If it was determined that not all of the possible symbols for representing the type and length of the identification information had been used at step 46, the process will have moved to step 56. At step 56, the process simply chooses one of the open symbols representing type and length and uses that symbol for the type field.

After all of the symbols have been chose, the process moves to placing the symbols and the data in the memory store. Since identification information is being stored which has not already been stored in the memory or has been erased, the interface will want to place the new information in the addresses beginning with the address following the last new identification information type stored. This may be facilitated by placing an end of fields symbol (in the table 3 organization scheme, this symbol is represented by the hexadecimal number FF) in the address following the address containing the last type added. For example, the first time identification information (such as serial number) is stored in the memory store, an end of fields symbol will be placed in the address following the data. If the information on that same identification information type (serial number) is later changed, the end of fields symbol will not move since the previous data will simply be overwritten. If however, another type of identification information (such as hardware version) is stored, the end of fields symbol will be replaced by the first field of that new information (the type field). Then the end of fields symbol will be placed in the address following the last address storing the data on that new information (hardware version).

Thus, when placing the information on a new identification information type into the memory store, the interface must first, at step 58, scan through the memory store until it finds an end of fields symbol, and then, at step 60, replace the end of fields symbol with the first symbol. At step 62, the addresses following this first symbol will be filled with any additional symbols that were chosen. Following the placement of all the symbols in the memory store, the process will, at step 64, store the identification information itself in the memory store, using up only the amount of storage needed. Last, at step 66, an end of fields symbol may be placed in the address following the identification information.

Figure 4:
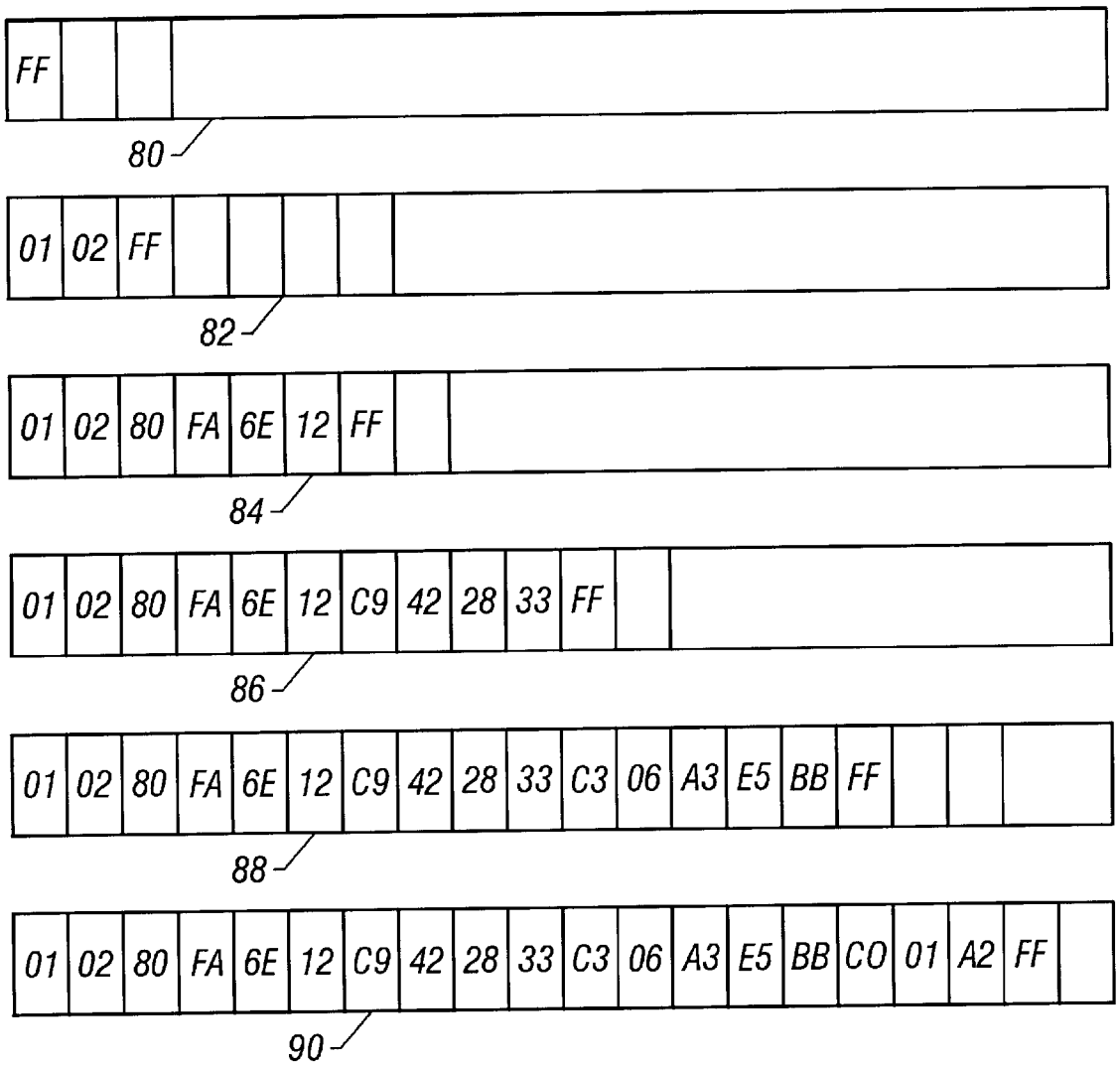
FIG. 4 is a diagram showing a sample memory store acted upon by the present invention at various stages of the storage process.

An example of how the memory store may appear at various stages in the method is depicted in FIG. 4. In the beginning, at reference numeral 80, there is nothing but an end of fields symbol (FF) in the memory store. If information on number of slots is to be stored, the interface receives the information (suppose there is 2 slots on the device so the information is "02"). Then the interface finds out the type and length of the information ("Number of Slots" and one byte). The interface looks to see if information on the number of slots is already stored, and finding none, proceed to determining if it recognizes the information type. Referring to table 2, the table of defined device identification information types, it find that it does recognize the type "Number of Slots". Since its in the table of defined device identification types, there is no need to look it up in the adjunct table as well.

The interface then asks if the length of the information (one byte) contained in the predefined set of lengths (here, {1,2,4}). Since it is, it then asks if all of the possible symbols for representing this type and length been used. There are still plenty of available symbols, so the answer is no. The interface then chooses a first symbol which represents the type and length of the device identification information. Since the device identification information type is already defined, it simply chooses the symbol associated with that type (01). The interface scans through the memory store until finding an end of fields symbol (which it finds in the first address). It then replaces the end of fields symbol with the first symbol (placing 01 in the memory store in place of FF), and proceeds to store the device identification information (here, the number 02, taking up only one byte). Lastly, it places an end of fields symbol in the address following the device identification information. The result is the memory store depicted at reference numeral 82.

When the next device identification information is received, the process starts over. Suppose this information is the "Derivation Number", which is three bytes long and consists of the hexadecimal number FA6E12. The interface looks up the tables to see if it recognizes the type, which it does. The same process is then followed, with the length being contained in the predefined set of lengths and not all of the possible symbols for this type and length being used. The first symbol chosen will be '80" (referring to table 2). Therefore an 80 replaces the FF symbol. Then the three byte sequence FA 6E 12 is placed in the memory store, followed by the end of fields symbol. This results in the memory store of reference numeral 84.

Suppose the next device identification information is a completely new type called "Heat Factor". The interface receives this information (which consists of the 2 byte sequence F2D2). Since this type is not located in any of the tables, the interface chooses a first symbol which represents that the next address contains a length field. This is chosen from the range C0 through FE. Since C0 through C8 have already been assigned to defined types in table 2, the interface chooses C9 as the first symbol. Then a second symbol which be chosen representing the length of the information and the preferred method of displaying the information. Suppose the information should be displayed as a decimal number, then the hexadecimal number 42 is chosen for the second symbol (the binary number 00000002 representing the length and the upper two bits changed to 01 representing the preferred method of displaying the information). These symbols are placed in the memory store followed by the device identification information (2833) and an end of fields symbol, resulting in the memory store of reference numeral 86. It should be noted that even though the length (two bytes) was in the predefined set of lengths, a length field was still used. This is due to the fact that the information is of a completely new type, and in order to guarantee backwards compatibility, it is preferable to include the preferred method of displaying the information, as well as its type, length, and data.

Suppose the next information that is sent is the "MAC address". The interface recognizes this from the table, but the length (six bytes) is not within the predefined set of lengths. Therefore, a length field is again used, but this time without indicating the preferred method of displaying the information. Thus, a C3 is placed (according to table 2) to represent the type, a 06 is placed to represent the length of the data, and then the six bytes of data (A3E5BB) is placed following by the end of fields symbol. The result is the memory store of reference numeral 88.

Lastly, suppose all of the symbols in the range 01 through 3F are used, yet the user wishes to place a recognized (although not defined) information type in the memory store. In this case, an extension address symbol (00) will be chosen as the first symbol, followed by a symbol representing the type and length of the information (a 01 is chosen— wrapping around at the beginning of the range 01 through 3F). Then the device identification information (A2) is stored followed by the end of fields symbol. The result is the memory store of reference numeral 90.

As each piece of information was placed in the memory store, the interface may have placed the corresponding information type in the adjunct table (if the type wasn't defined) so that the type is one that is recognized. While this would not likely affect the operation of the interface, it is possible that the information may be erased at some point and the fact that the information type is recognized (and thus has already been assigned a symbol) may be used if the user wishes to again place information of that type in the memory store.

The present invention allows manufacturing and other groups to alter identification formats to suits their needs by adding fields when needed. In addition, the length of the device identification information may be altered at any time by simply altering the type and/or length fields. This provides for more efficient use of the available storage space in the memory store. The present invention also provides the ability to add a new identification information type without having to worry about backward compatibility, through storing information about the preferred method of displaying the information in the length field.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for storing device identification information in a flexible address format in a memory store associated with a device of a network, said method including:

receiving the device identification information, the device identification information having a type and length;

determining the type and length of the device identification information;

selecting a single symbol to represent both the type and length of the device identification information;

storing said single symbol in the memory store, beginning at an available address in the memory store; and storing said device identification information in a data field in the memory store, said data field beginning at an available address next to said single symbol stored in the memory store, said data field having a data length equal to the length of the device identification information represented by said single symbol.

2. The method of claim 1, wherein said determining includes:

receiving the type and length of the device identification information.

3. The method of claim 1, wherein said determining includes:

receiving the type of the device identification information; and determining the length of the device identification information.

4. The method of claim 1, further including:

determining if the type of the device identification information has already been stored;

overwriting the device identification information already stored with the current device identification information if the type of the device identification information has already been stored; and ending the process if the type of the device identification information has already been stored.

5. The method of claim 4, wherein said determining if the type of the identification information has already been stored further includes:

examining the types of device identification information already stored in said memory store; and determining if any of the types of device identification information already stored match the current device identification information type.

6. The method of claim 1, wherein said storing said one or more symbols includes:

scanning through the memory store until reaching an end of fields symbol;

replacing said end of fields symbol with the first of said one or more symbols; and storing any of the remaining said one or more symbols in the next available addresses in the memory store.

7. The method of claim 1 further including:

placing an end of fields symbol in the next address following the addresses storing said device identification information.

8. The method of claim 1, wherein said selecting includes:

choosing a single symbol to represent both the type and length of the device identification information, if the length of the device identification information is contained in a predefined set of lengths; and choosing a first symbol which represents said type of the device identification information and represents the fact that the next address contains a length field, and a second symbol which represents the length of the device identification information, if said length is not contained in said predefined set of lengths.

9. The method of claim 1, wherein said selecting includes:

choosing a first symbol which represents both the type and length of the device identification information, if the length of the device identification information is contained in a predefined set of lengths and not all of the possible symbols for that type and length have been used;

choosing a number of extension address symbols in order to represent an unused type symbol, and a last symbol which represents the type and length of the device identification information, if the length of the device identification information is contained in said predefined set of lengths and all of the possible symbols for that type and length have been used; and choosing a first symbol which represents the type of the device identification information and represents the fact that the next address contains a length field, and a second symbol which represents the length of the device identification information, if the length of the device identification information is not contained in said predefined set of lengths.

10. The method of claim 1, wherein said selecting includes:

choosing a first symbol which represents both the type and length of the device identification information, if the type of the device identification information is recognized by an interface associated with the device and the length of the device identification information is contained in a predefined set of lengths;

choosing a first symbol which represents the type of the device identification information and represents the fact that the next address contains a length field, and a second symbol which represents the length of the device identification information, if the type of the device identification information is recognized by the interface and the length of the device identification information is not contained in said predefined set of lengths; and choosing a first symbol which represents the type of the device identification information and represents the fact that the next address contains a length field, and a second symbol which represents the length of the device identification information and the preferred method of displaying the device identification information, if the type of the device identification information is not recognized by the interface.

11. The method of claim 1, wherein said selecting includes:

choosing a number of extension address symbols in order to represent an unused type symbol, and a last symbol which represents both the type and length of the device identification information, if the type of the device identification information is recognized by an interface associated with the device, the length of the device identification information is contained in a predefined set of lengths, and all of the possible symbols for the type and length of the device identification information have been used;

choosing a first symbol which represents both the type and length of the device identification information, if the type of the device identification information is recognized by the interface, the length of the device identification information is contained in said predefined set of lengths, and not all of the possible symbols for the type and length of the device identification information have been used;

choosing a first symbol which represents the type of the device identification information and represents the fact that the next address contains a length field, and a second symbol which represents the length of the device identification information, if the type of the device identification information is recognized by the interface and the length of the device identification information is not contained in said predefined set of lengths; and choosing a first symbol which represents the type of the device identification information and represents the fact that the next address contains a length field, and a second symbol which represents the length of the device identification information and the preferred method of displaying the device identification information, if the type of the device identification information is not recognized by the interface.

12. An interface for storing identification information in a flexible address format in a memory store on a network device, including:

a receiver which receives the device identification information, the device identification information having a type and length;

a type and length finder which finds out the type and length of the device identification information;

a symbol chooser which chooses a single symbol to represent both the type and length of the device identification information;

a symbol storer which stores said single symbol in the memory store, beginning at an available address in the memory store; and an information storer, which stores the device identification information in a data field in the memory store, said data field beginning at an available address next to said single symbol stored in the memory store, said data field having a data length equal to the length of the device identification information represented by said single symbol.

13. The interface of claim 12, wherein said type and length finder includes:

a receiver which receives the type and length of the device identification information.

14. The interface of claim 13, wherein said type and length finder includes:

a receiver which receives the type and length of the device identification information; and a counter which determines the length of the device identification information.

15. The interface of claim 12, further including:

a type determiner which determines if the device identification information has already been stored; and a writer which overwrites the device identification information already stored with the current device identification information, if the type of the device identification information has already been stored.

16. The interface of claim 15, wherein said type determiner includes:

a scanner which scans through said memory store, examining the type of device identification information already stored; and a matcher, which determines if any of the types of device identification information already stored match the current device identification information type.

17. The interface of claim 12, wherein said symbol storer includes:

a scanner which scans through said memory store until reaching an end of fields symbol;

a writer which replaces said end of fields symbol with said first symbol; and a writer which stores any remaining symbols in the next available addresses in the memory store.

18. The interface of claim 12, further including:

an end of fields symbol placer, which places an end of fields symbol in the next address following the addresses storing said device identification information.

19. The interface of claim 12, wherein said symbol chooser includes:

a type and length symbol chooser, which chooses one or more symbols which represent the type and length of the device identification information if the length of the device identification information is contained in a predefined set of lengths; and a second type and length symbol chooser, which chooses a first symbol which represents the type of the device identification information and represents the fact that the next address contains a length field, and a second symbol which represents the length of the device identification information, if said length is not contained in said predefined set of lengths.

20. The interface of claim 12, wherein said symbol chooser includes:

a type and length symbol chooser which chooses a first symbol which represents the type and length of the device identification information if said length is contained in a predefined set of lengths and not all of the possible symbols for that type and length have been used;

a second type and length symbol chooser which chooses one or more extension address symbols in order to represent an unused type symbol and a last symbol which represents the type and length of the device identification information, if said length is contained in said predefined set of lengths and all of the possible symbols for that type and length have been used; and a third type and length symbol chooser which chooses a first symbol which represents the type of the device identification information and represents the fact that the next address contains a length field, and a second symbol which represents the length of the device identification information, if said length is not contained in said predefined set of lengths.

21. The method of claim 12, wherein symbol chooser includes:

a type and length symbol chooser which chooses a first symbol which represents the type and length of the device identification information, if the type of the device identification information is recognized by an interface associated with the network device and the length of the device identification information is contained in a predefined set of lengths;

a second type and length symbol chooser which chooses a first symbol which represents the type of the device identification information and represents the fact that the next address contains a length field, and a second symbol which represents the length of the device identification information, if the type of the device identification information is recognized by the interface and the length of the device identification information is not contained in said predefined set of lengths; and a third type and length symbol chooser which chooses a first symbol which represents the type of the device identification information and represents the fact that the next address contains a length field, and a second symbol which represents the length of the device identification information and the preferred method of displaying the device identification information, if the type of the device identification information is not recognized by the interface.

22. The interface of claim 12, wherein said symbol chooser includes:

a type and length symbol chooser which chooses one or more extension address symbols in order to represent an unused type symbol, and a last symbol which represents the type and length of the device identification information if the type of the device identification information is recognized by an interface associated with the network device, the length of the device identification information is contained in a predefined set of lengths, and all of the possible symbols for the type and length of the device identification information have been used;

a second type and length symbol chooser which chooses a first symbol which represents the type and length of the device identification information if the type of the device identification information is recognized by the interface, the length of the device identification information is contained in a predefined set of lengths, and not all of the possible symbols for the type and length of the device identification information have been used;

a third type and length symbol chooser which chooses a first symbol which represents the type of the device identification information and represents the fact that the next address contains a length field, and a second symbol which represents the length of the device identification information, if the type of the device identification information is recognized by the interface and the length of the device identification information is not contained in said predefined set of lengths; and a fourth type and length symbol chooser which chooses a first symbol which represents the type of the device identification information and represents the fact that the next address contains a length field, and a second symbol which represents the length of the device identification information and the preferred method of displaying the device identification information, if the type of the device identification information is not recognized by the interface.

23. A memory device for the storage of network device identification information in a flexible address format, said memory device including:

a type field, said type field containing a single symbol representing both the type and length of the network device identification information if the length of the network device identification information is contained in a predefined set of lengths, and said type field containing a symbol representing the type of the network device identification information if the length of the network device identification information is not contained in said predefined set of lengths;

a length field if the length of the network device identification information is not contained in said predefined set of lengths, said length field containing a symbol representing the length of the network device identification information;

a data field, said data field containing the network device identification information and having a data length equal to the length of the network device identification information represented by said single symbol; and an end of fields marker.

24. A memory device for the storage of network device identification information in a flexible address format, said memory device including:

a type field, said type field containing a single symbol representing both the type and length of the network device identification information if the length of the network device identification information is contained in a predefined set of lengths and not all of the possible symbols for that type and length have been used, said type field containing one or more extension address symbols and a symbol representing the type and length of the network device identification information if the length of the network device identification information is contained in said predefined set of lengths and all of the possible symbols for that type and length have been used, said type field also containing a symbol representing the type of the network device identification information if the length of the network device identification information is not contained in said predefined set of length;

a length field if the length of the network device identification information is not contained in said predefined set of lengths, said length field containing a symbol representing the length of the network device identification information;

a data field, said data field containing the network device identification information and having a data length equal to the length of the network device identification information represented by said one or more symbols; and an end of fields marker.

25. A memory device for the storage of network device identification information in a flexible address format, said memory device including:

a type field, said type field containing a single symbol representing both the type and length of the network device identification information if (a) the length of the network device identification information is contained in a predefined set of lengths, and (b) the type of the network device identification information is recognized by an interface associated with the network device, said type field containing a symbol representing the type of the network device identification information if (a) the length of the network device identification information is not contained in said predefined set of lengths, or (b) the type of the network device identification information is not recognized by an interface associated with the network device;

a length field if (a) the length of the network device identification information is not contained in a predefined set of lengths, or (b) the type of the network device identification information is not recognized by an interface associated with the network device, said length field containing a symbol representing the length of the network device identification information if the type of the network device identification information is recognized by an interface associated with the network device, said length field containing a symbol representing the length of the device identification information and the preferred method of displaying the network device identification information if the type of the network device identification information is not recognized by an interface associated with the network device;

a data field, said data field containing the network device identification information and having a data length equal to the length of the network device identification information represented by said single symbol; and an end of fields marker.

26. A memory device for the storage of network device identification information in a flexible address format, said memory device including:

a type field, said type field containing a single symbol representing both the type and length of the network device identification information if (a) the length of the network device identification information is contained in a predefined set of lengths, (b) the type of the network device identification information is recognized by an interface associated with the network device, and (c) not all of the possible symbols for that type and length have been used, said type field containing one or more extension address symbols and a symbol representing the type and length of the network device identification information if (a) the length of the network device identification information is contained in said predefined set of lengths, (b) the type of the network device identification information is recognized by an interface associated with the network device, and (c) all of the possible symbols for that type and length have been used, said type field containing a symbol representing the type of the network device identification information if (a) the length of the network device identification information is not contained in said predefined set of lengths, or (b) the type of the network device identification information is not recognized by an interface associated with the network device;

a length field if (a) the length of the network device identification information is not contained in said predefined set of lengths, or (b) the type of the network device identification information is not recognized by an interface associated with the network device, said length field containing a symbol representing the length of the network device identification information if the type of the network device identification information is recognized by an interface associated with the network device, said length field containing a symbol representing the length of the device identification information and the preferred method of displaying the network device identification information if the type of the network device identification information is not recognized by an interface associated with the device;

a data field, said data field containing the network device identification information and having a data length equal to the length of the network device identification information represented by said single symbol; and an end of fields marker.

27. A memory device for the storage of network device identification information in a flexible address format, the contents of the memory device being formed by:

receiving the device identification information, the device identification information having a type and length;

determining the type and length of the device identification information;

selecting a single symbol according to both the type and length of the device identification information, said single symbol representing both the type and length of the device identification information;

storing said single symbol in the memory store, beginning at an available address in the memory store, said single symbol stored in the memory store defining a type/length field in the memory store; and storing said device identification information in a data field in the memory store, said data field beginning at an available address next to said type/length field, said data field having a data length equal to the length of the device identification information represented by said single symbol.

28. The memory device of claim 27, wherein said determining includes:

receiving the type and length of the network device identification information.

29. The memory device of claim 27, wherein said determining includes:

receiving the type of the network device identification information; and determining the length of the network device identification information.

30. The memory device of claim 27, wherein the contents of the memory device are further formed by:

determining if the type of the network device identification information has already been stored;

overwriting the network device identification information already stored with the current network device identification information if the type of the network device identification information has already been stored; and ending the storage process if the type of the network device identification information has already been stored.

31. The memory device of claim 30, wherein said determining if the type of the identification information has already been stored further includes:

examining the types of network device identification information already stored in said memory store; and determining if any of the types of network device identification information already stored match the current network device identification information type.

32. The memory device of claim 27, wherein said storing said single symbol includes:

scanning through the memory store until reaching an end of fields symbol;

replacing said end of fields symbol with the first of said single symbol.

33. The memory device of claim 27, wherein the contents of the memory device are further formed by:

placing an end of fields symbol in the next address following the addresses storing said network device identification information.

34. The memory device of claim 27, wherein said selecting includes:

choosing a single symbol to represent both the type and length of the network device identification information, if the length of the network device identification information is contained in a predefined set of lengths; and choosing a first symbol which represents said type of the network device identification information and represents the fact that the next address contains a length field, and a second symbol which represents the length of the network device identification information, if said length is not contained in said predefined set of lengths.

35. The memory device of claim 27, wherein said selecting includes:

choosing a first symbol which represents both the type and length of the network device identification information, if the length of the network device identification information is contained in a predefined set of lengths and not all of the possible symbols for that type and length have been used;

choosing a number of extension address symbols in order to represent an unused type symbol, and a last symbol which represents both the type and length of the network device identification information, if the length of the network device identification information is contained in said predefined set of lengths and all of the possible symbols for that type and length have been used; and choosing a first symbol which represents the type of the network device identification information and represents the fact that the next address contains a length field, and a second symbol which represents the length of the network device identification information, if the length of the network device identification information is not contained in said predefined set of lengths.

36. The memory device of claim 27, wherein said selecting includes:

choosing a first symbol which represents both the type and length of the network device identification information, if the type of the network device identification information is recognized by the interface and the length of the network device identification information is contained in a predefined set of lengths;

choosing a first symbol which represents the type of the network device identification information and represents the fact that the next address contains a length field, and a second symbol which represents the length of the network device identification information, if the type of the network device identification information is recognized by the interface and the length of the network device identification information is not contained in said predefined set of lengths; and choosing a first symbol which represents the type of the network device identification information and represents the fact that the next address contains a length field, and a second symbol which represents the length of the network device identification information and the preferred method of displaying the network device identification information, if the type of the network device identification information is not recognized by the interface.

37. The memory device of claim 27, wherein said selecting includes:

choosing a number of extension address symbols in order to represent an unused type symbol, and a last symbol which represents the type and length of the network device identification information, if the type of the network device identification information is recognized by the interface, the length of the network device identification information is contained in a predefined set of lengths, and all of the possible symbols for the type and length of the network device identification information have been used;

choosing a first symbol which represents the type and length of the network device identification information, if the type of the network device identification information is recognized by the interface, the length of the network device identification information is contained in said predefined set of lengths, and not all of the possible symbols for the type and length of the network device identification information have been used;

choosing a first symbol which represents the type of the network device identification information and represents the fact that the next address contains a length field, and a second symbol which represents the length of the network device identification information, if the type of the network device identification information is recognized by the interface and the length of the network device identification information is not contained in said predefined set of lengths; and choosing a first symbol which represents the type of the network device identification information and represents the fact that the next address contains a length field, and a second symbol which represents the length of the network device identification information and the preferred method of displaying the network device identification information, if the type of the network device identification information is not recognized by the interface.

38. A program storage device readable by a machine, tangibly embodying a program of instructions executable by the machine to perform a method for storing device identification information in a flexible address format in a memory store associated with a device of a network, said method including:

receiving the device identification information, the device identification information having a type and length;

determining the type and length of the device identification information;

selecting a single symbol according to both the type and length of the device identification information, said single symbol representing both the type and length of the device identification information;

storing said single symbol in the memory store, beginning at an available address in the memory store, said single symbol stored in the memory store defining a type/length field in the memory store; and storing said device identification information in a data field in the memory store, said data field beginning at an available address next to said type/length field, said data field having a data length equal to the length of the device identification information represented by said single symbol.

39. A method for storing device identification information in a flexible address format in a memory store associated with a device of a network, the device identification information having a type and length, said method including:

preparing symbols representing both a type and length of the device identification information, said symbols including a set of type/length symbols representing a type and a predefined data length, a set of type symbols representing a type and indicating that another symbol representing a data length is stored in the next address, and a set of length symbols representing a data length;

determining the type and length of the device identification information;

selecting a single symbol according to both the type and length of the device identification information;

storing said single symbol in a type/length field in the memory store, said type/length field beginning at an available address in the memory store; and storing said device identification information in a data field in the memory store, said data field beginning at an available address next to said type/length field, said data field having a data length equal to the length of the device identification information represented by said single symbol.

40. The method of claim 39, wherein said preparing symbols further includes preparing an end of fields symbol indicating the end of last-stored device identification information.

41. The method of claim 40, wherein said preparing symbols further includes preparing an extension symbol indicating that a type symbol stored in the next address be read together therewith.

42. The method of claim 39, wherein said type/length field has a length equal to a total length of said single symbol selected.

* * * * *